Dec. 19, 1961 W. F. ALEXANDER 3,013,441
TRACKING CONTROL APPARATUS
Filed Dec. 30, 1958 3 Sheets-Sheet 1

INVENTOR.
WILLIAM F. ALEXANDER,
BY
Donald L. Royer
AGENT.

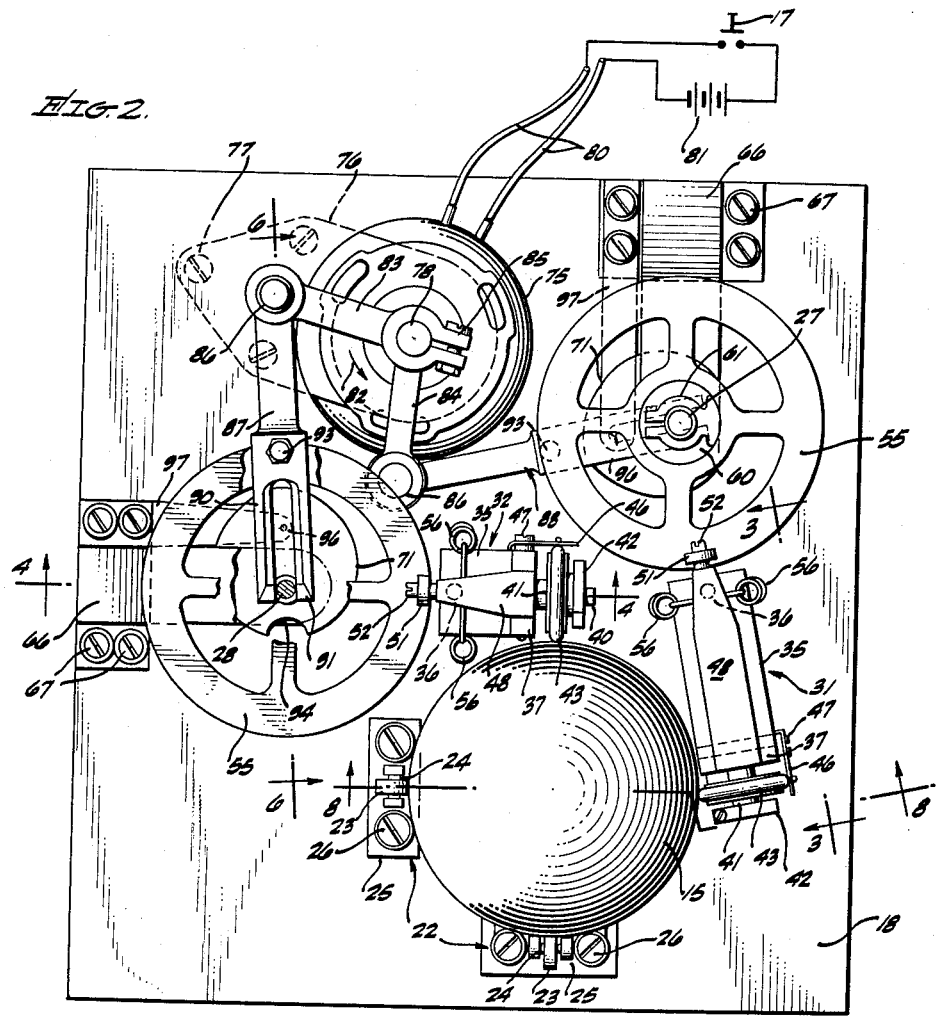

INVENTOR.
WILLIAM F. ALEXANDER,
BY
AGENT

United States Patent Office 3,013,441
Patented Dec. 19, 1961

3,013,441
TRACKING CONTROL APPARATUS
William F. Alexander, Hawthorne, Calif., assignor to Hughes Aircraft Company, Culver City, Calif., a corporation of Delaware
Filed Dec. 30, 1958, Ser. No. 783,991
7 Claims. (Cl. 74—471)

The present invention relates generally to a radar target tracking control apparatus and relates more specifically to a ball operated mechanism operably connected to suitable mechanical structure, movement of which provides output signals that may be used for control of radar trackers or the like types of devices.

In the tracking of an aerial vehicle through use of radar apparatus, an indication thereof is generally produced in the form of a pip on a screen or face of a cathode ray tube. Usual tracking systems employ a tracking pip also visible on the cathode ray tube, this tracking pip being also an indication of radar antenna position, aiming position of ground control missiles or other factors. Tracking is accomplished by manually positioning the tracking pip on the tube face in a location overlying the pip produced by an aerial vehicle. In order to position the tracking pip in the manner described, it is necessary that manual controls be provided for operating the apparatus.

Prior controls utilized in the operation of the tracking apparatus have taken the form of stick and gimbal structures, plural hand wheels, cranks and other geared mechanisms. Structures of this type must necessarily be complex and include numerous small components and watch-like mechanisms that are difficult to manufacture, expensive and which frequently require repair. Additionally, stick and gimbal structures present a so-called four corner or quadrant feel and smooth operation of the mechanism is difficult to obtain. It is often necessary that the tracking pip on the cathode ray tube be moved simultaneously through two dimensions, an accepted test for the operating conditions of the control mechanism being the tracing of a figure eight on the face of the tube. The stick and gimbal structures, due to the existence of free play and backlash inherent in such structures, make the tracing of such a figure eight practically impossible.

Other devices have been used as tracking controls, such as rubber mounted handles utilizing a conductive material in the rubber mounting and changing resistivity therethrough due to compression of the rubber. Such structures have not been accurate or suitably dependable to meet the requirements of the precise apparatus. Additionally, control mechanisms employing multiple wheels, handles or cranks present additional problems relative to the necessity for precise manual coordination in integrated operation of the structures. Accordingly, the accuracy, dependability and effectiveness of such prior structures leaves much to be desired.

In tracking control mechanisms it is important that the structures thereof present a smooth, continuous operation in at least two dimensions and including angular movement deviating from normal X and Y axes. The operator of such structures must be able to rely upon the apparatus and an accurate indication of positions thereof must be provided. These structures must also be relatively inexpensive, contain as few components as possible and must be relatively easy to manufacture and maintain, thus to present a high degree of dependability. Additionally, when several target pips are presented on the cathode ray tube, automatic means must be provided for centering the tracking pip in order first to provide for differentiation between the tracking pip and the target pips and, second, rapidly to position the tracking pip at a location providing the shortest travel distance to several target pips.

It is, accordingly, one object of the present invention to provide a tracking control apparatus having easily operated, smooth, nonfatiguing and reliable control structures therein.

Another important object of the invention is to provide a tracking control apparatus having means for automatically centering a tracking pip.

Still another object of the invention is to provide a ball operated tracking control mechanism, having an integrated output, for positioning, in a divided manner, structures used to produce electrical signals.

It is still another important object of this invention to provide a tracking control mechanism that is simple in construction and which may accomplish the desired functions with a minimum of components and operating parts thereof.

A further object of the invention is to provide a tracking control for a radar system wherein all motion transmitting and translating structures are frictionally interconnected.

Other and further important objects of the invention will become apparent from the disclosures in the following detailed specification, appended claims and accompanying drawings, wherein:

FIG. 2 is a plan view (cover removed) of the present tracking apparatus;

FIG. 3 is an enlarged fragmentary view, partially in section, and showing the interconnecting motion transmitting mechanism between a control ball and a signal producing device, as taken substantially as indicated by line 3—3, FIG. 2;

Figure 1:
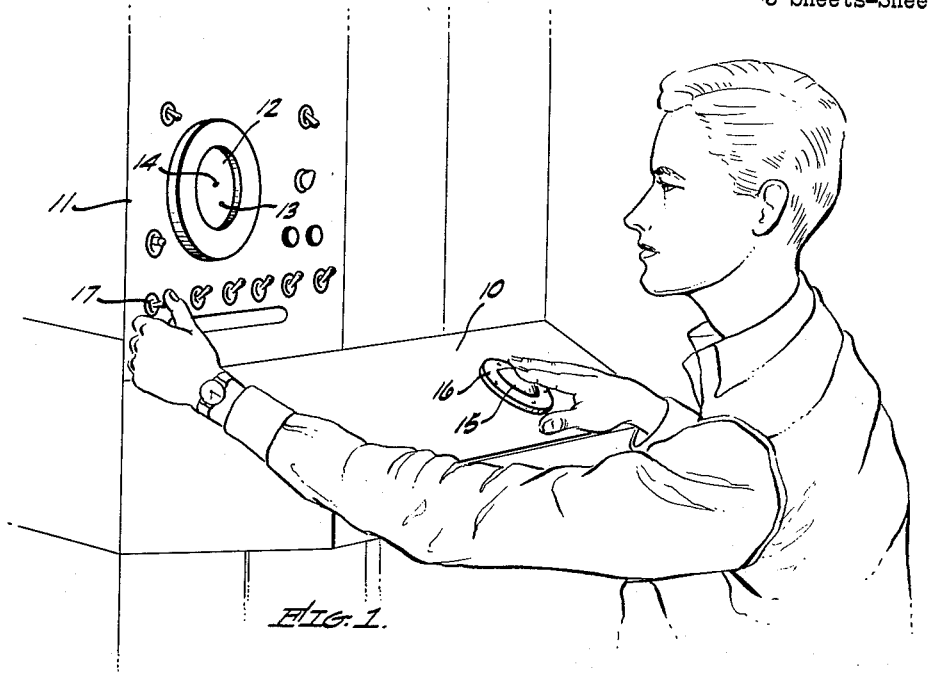
FIGURE 1 is a perspective view showing the control ball operating mechanism for the present tracking apparatus in connection with a control console and face of a cathode ray tube.

With reference to the drawings and with reference primarily to FIG. 1, the tracking control apparatus of this invention is preferably enclosed within a suitable housing 10 forming a portion of a control console 11. The control console is provided with suitable control structures including a cathode ray tube, the screen or face of which is indicated at 12. The radar system with which the present control device is employed serves to produce one or more target pips indicated at 13 on the face of the cathode ray tube, the system also presenting a tracking pip indicated at 14.

For tracking of a target, the tracking control must be manually adjusted whereby to dispose the tracking pip 14 in a position overlying the target pip 13. To accomplish this positioning of the pip 14, a control sphere or ball 15 is adapted for movement in a universal manner by the fingers of an operator. The ball control 15 has a portion of the outer surface thereof disposed through an upper surface of the housing 10 and is mounted in position by means of a retaining ring 16 secured to the housing 10. The operator is also provided with a switch 17 that, when operated, initiates operation of a pip centering structure to be described in detail hereinafter. Through use of the switch 17, the operator may return the tracking pip 14 to a central position on the face 12 of the cathode ray tube, whereby to provide a differentiation between the tracking pip and the target pip or pips and to locate the tracking pip at a position that is the shortest random distance to any selected target pip.

As shown primarily in FIG. 2, the tracking mechanism, including the ball 15, is mounted on a generally rectangular suitable base member 18. The ball 15 is preferably made from light weight (low inertia) nonconductive material such as nylon or the like, having a slight tooth on the outer surface thereof and is freely disposed in a concave receptacle 20, there being a plurality of ball bearings 21 that are freely disposed in the receptacle 20 and positioned between an inner surface of the receptacle 20 and an outer surface of the ball 15. The receptacle 20 has an inner radius that depends from a center that is spaced upwardly from the center of rotation of the control ball 15. The ball 15 is thus permitted universal relative friction free movement that is relatively friction free due to the interaction with the ball bearings 21 and the radius differences permit the ball 15 to rest on only a very few of the ball bearings 21. The bearings 21 are also thereby permitted to circulate under the ball 15, there being no tendency for the bearings to be rolled out of the receptacle 20. The ball 15 is also retained against lateral movement by means of a pair of steady rests 22 that are disposed on normal axes of the ball 15. Each of the steady rests 22 includes a roller 23 that is mounted on a shaft 24 that is in turn carried by a bracket 25. The brackets 25 are secured to the base member 18 by means of a pair of screws 26. It is to be noted that the axes of the rollers 23 are disposed in a horizontal plane lying substantially on the axis of the ball 15.

Movement of the ball 15 in a universal manner is adapted to act through suitable mechanism, to be described hereinafter, to rotate one or both of a pair of shafts 27 and 28. The shafts 27 and 28 are disposed normal to the base member 18 and are operatively connected through suitable clutch mechanisms to signal output structures, one of which is indicated at 30 in FIG. 4. The structures 30 may be in the form of potentiometers or digitizers and are suitably electrically connected to the radar system, whereby to provide electrical signals for the positioning of the tracking pip 14. One of the signal structures 30 controls positioning of the tracking pip 14 in a vertical aspect on the face 12 of the cathode ray tube, the other of the signal structures providing control of the tracking pip 14 in a horizontal aspect. This invention, therefore, is directed to the manner of providing a divided movement and adjustment of the signal structures 30 from an integrated movement of the control ball, the connection of the signal structures 30 and operation in accordance with the balance of the radar system forming no part of the present invention.

With refrence now primarily to FIGS. 2 and 3, a pair of motion transmitting devices, indicated generally at 31 and 32, are positioned in operative association with and between the control ball 15 and the shafts 27 and 28. The motion transmitting devices 31 and 32 are substantially identical with the exception of different lengths thereof and only one of the devices will be described, like components thereof being indicated by like reference numerals in the several figures and for each of the devices 31 and 32.

Figure 9:
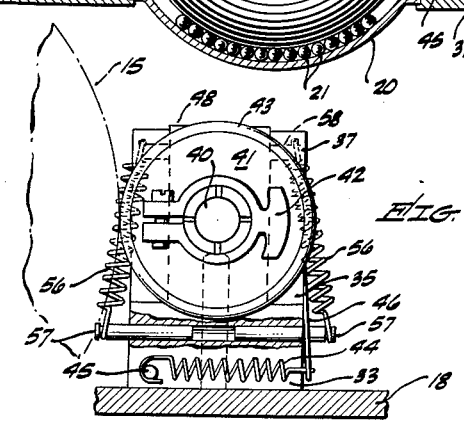
FIG. 9 is an enlarged fragmentary sectional view showing the frictional interconnection with the control ball.

The devices 31 and 32 each include a generally U-shaped mounting block 33 that is secured to the base member 18 by means of screws 34. A lever 35 is movably positioned on the upper surface of the mounting block 33 and pivotally secured thereon by means of a vertically disposed pivot pin 36 that is located adjacent one end of the lever 35 and supported by the mounting block 33. The lever 35 has vertically disposed integral end portions 37 and 38 in which a shaft 40 is rotatably journaled. Suitable bearings are disposed between the shaft 40 and the portions 37 and 38. One end of the shaft 40 has a wheel 41 secured thereto and retained in position by means of a clamp 42. The outer surface of the wheel 41 is adapted to support an annular resilient ring 43, the outer surface of which is adapted to contact the outer surface of the ball 15. The resilient ring 43 may be made from rubber or like material and is biased into contact with the ball 15 by means of a tension spring 44, FIG. 9, one end of which is connected to a pin 45 disposed outwardly from one end of the mounting block 33, the other end being connected to a downwardly disposed spring bracket 46 that is secured to the lever 35 as by a screw 47. It is to be noted that the spring 44 and supporting structure therefor is at the end of the lever 35 remote from the pivot pin 36.

The end 37 of the lever 35 is bifurcated and adapted pivotally to support an elongated arm 48 as by a transversely disposed pivot pin 50. The arm 48 is adapted to overlie the lever 35 and shaft 40 and at its free end is adapted rotatably to support a roller 51 that is mounted on a shaft 52 disposed in a coextensive manner relative to the arm 48. As shown primarily in FIG. 3, an end of the shaft 40, remote from the wheel 41, has a wheel 53 secured thereto and about which a pair of resilient rings 54, of rubber or like material, are disposed. The rings 54 and the roller 51 are in substantial vertical alignment and are adapted for cooperation with upper and lower surfaces of an annular, vertically flexible disc 55. The resilient rings 54 engage the lower surface of the disc 55 and the roller 51 engages the upper surface of the disc 55, the roller 51 being biased into contact with the disc 55 by means of a pair of tension springs 56 positioned on each lateral side of the arm 48 and lever 35. Lower ends of the springs 56 are carried by pins 57 disposed laterally from the mounting block 33, upper ends of the springs 56 being carried by pins 58 disposed laterally from the arm 48.

It may thus be seen that the motion transmitting devices 31 and 32 frictionally transmit motion from the control ball 15 to the discs 55, one of the discs 55 being connected to each of the shafts 27 and 28 as by a hub 60 and a clamp 61. Thus, any motion of the ball 15 will be translated into vertical and horizontal signal components from the signal structures 30 by rotation of one or both of the shafts 27 and 28. It is to be noted that the resilient rings 43 of each of the devices 31 and 32 engage the ball 15 at positions substantially diametrically opposed to the positions of the rollers 23 of the steady rests 22 and that axes of the shafts 40 lie substantially in a horizontal plane extending through the axis of the ball 15. By thus positioning the ball 15 relative to the rings 43 and the rollers 23, any movement of the ball other than normal to the axes of rotation of the rings 43 and rollers 23 will create only light frictional loads due to the point contact arrangements.

Figure 4:
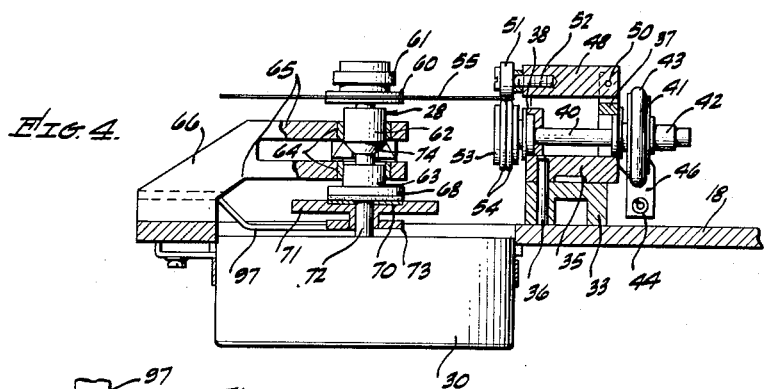
FIG. 4 is a fragmentary sectional view through the inter-connecting mechanism of FIG. 3 and a portion of the automatic centering mechanism, as taken substantially as indicated by line 4—4, FIG. 2.
Figure 5:
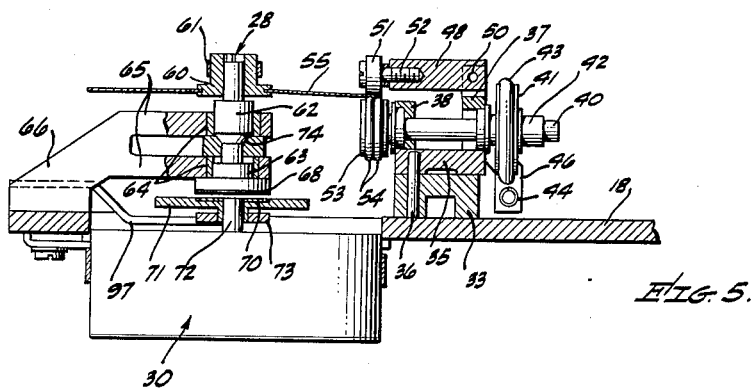
FIG. 5 is a sectional view similar to FIG. 4 showing components in different positions.
Figure 6:
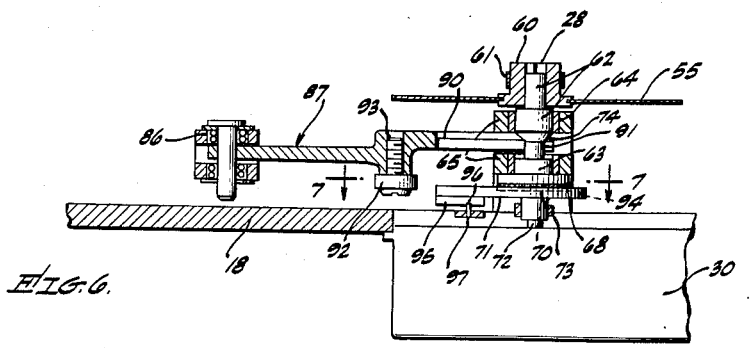
FIG. 6 is a fragmentary sectional view showing additional details of the centering mechanism, as taken substantially as indicated by line 6—6, FIG. 2.
Figure 8:
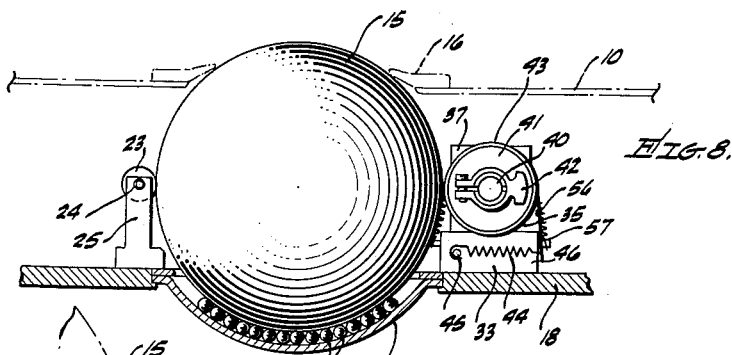
FIG. 8 is a fragmentary sectional view showing the manner of supporting the control ball, as taken substantially as indicated by line 8—8, FIG. 2.

As shown in FIGS. 4, 5 and 6, each of the shafts 27 and 28 has vertically spaced enlarged portions 62 and 63 that are journaled in bearings 64 carried by a pair of horizontally disposed, vertically spaced, arm portions 65 of brackets 66. The brackets 66 are connected to the base member 18 adjacent outer edges thereof by means of suitable screws 67. Lower ends of the shafts 27 and 28 are fitted with a lined clutch member 68 that is adapted for cooperation with another clutch element in the form of a disc of frictional material 70 carried in an annular recess in an upper surface of a cam 71. The cam 71 is connected to a shaft 72 by means of a clamp 73, a pair of the shafts 72 being the input operating members for the signal structures 30. The enlarged portions 62 of the shafts 27 and 28 are provided with conical lower end portions 74 for a purpose to be hereinafter more fully described.

Means are provided for disengaging the clutch elements 68 and 70 and for effecting rotation of the shafts 72 and mechanism of the signal structures 30 to zero or null positions. When the signal structures 30 are so located in their zero or null positions, the pip 14 on the face 12 of the cathode ray tube will be displayed in the center of the face 12. The structure for effecting disconnection of the clutch elements 68 and 70 includes a rotary solenoid 75 that is carried by a bracket 76 which is in turn mounted on the base member 18 by means of screws 77. The rotary solenoid 75 has a vertically disposed output shaft 78. The solenoid 75 is connected by means of leads 80 to a source of electrical energy such as a battery 81 and to the switch 17, previously described. Energization of the rotary solenoid 75 serves to move the shaft 78 in the direction of the arrow 82, FIG. 2, the solenoid 75 being spring biased (not shown) in a direction opposite from the direction of the arrow 82.

As shown primarily in FIG. 2, a pair of arms 83 and 84 are connected to the rotary solenoid output shaft 78 by means of clamp structures 85. Outer ends of the arms 83 and 84 are pivotally connected, by means of bearings 86, to levers 87 and 88. The levers 87 and 88 are substantially identical in construction, with the lever 87 being associated with the shaft 28 and the lever 88 being associated with the shaft 27. Each of the levers 87 and 88 has a bifurcated end portion 90, extreme end portions thereof being adapted for disposition on lateral sides of the shafts 27 and 28 and within the vertical confines of inwardly directed surfaces of the portions 65 of the brackets 66. Free ends of the bifurcated end portions 90 are beveled as at 91 for cooperation with the conical portions 74 of the shaft enlargements 62.

Figure 7:
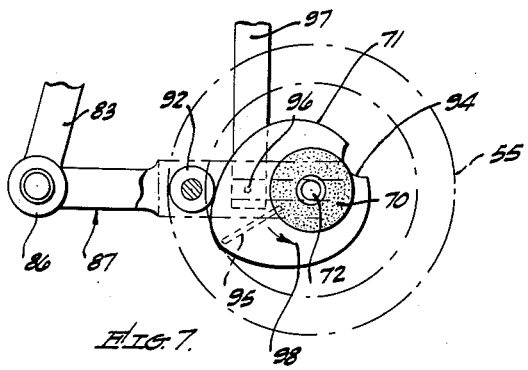
FIG. 7 is a fragmentary sectional view of other details of the centering mechanism, as taken substantially as indicated by line 7—7, FIG. 6.

The levers 87 and 88 each rotatably support a roller 92, adjacent a lower surface thereof, FIGS. 6 and 7, as by shafts 93. The rollers 92 are each adapted for cooperation with an outer surface of the cams 71 carried by the shafts 72. It is to be noted that the cams 71 are generally heart shaped and have a semicircular notch 94 which establishes the zero or null positions of the signal structures 30. The cams 71 also include a downwardly extending plate member 95 that is adapted for cooperation with a vertical pin 96 carried by an inwardly and downwardly disposed arm 97 that is supported by the screws 67 of the brackets 66. The plate member 95, in cooperation with the pin 96, serves to limit rotation of the cam 71 and to position the cam 71 in such a manner as to permit rotation thereof only in the direction of the arrow 98, FIG. 7.

Thus, upon energization of the rotary solenoid 75, through the arms 83 and 84 and levers 87 and 88, the shafts 27 and 28 may be raised, whereby to separate the clutch elements 68 and 70 and thereby to disconnect the shafts 27 and 28 from the operating shafts 72 of the signal structures 30. Additionally, immediately following separation of the clutch elements 68 and 70, the rollers 92 are moved into contact with the outer surfaces of the cams 71, whereby to rotate the cams 71 in the direction of the arrow 98 and until the rollers 92 engage the notches 94 in the cams. Thereafter, upon de-energization of the solenoid 75, the levers 87 and 88 will be withdrawn by the spring biased return action of the solenoid, thus permitting the clutch elements 68 and 70 to be moved into contact with each other to reconnect the shafts 27 and 28 with the shafts 72.

With reference to FIGS. 4 and 5, it is to be noted that the discs 55 are relatively thin and provided with a plurality of annular cutouts. The discs 55 are of resilient material and as the shafts 27 and 28 are elevated by action of the outer ends 91 of the levers 87 and 88, a peripheral portion of the discs 55, as retained between the rollers 51 and resilient rings 54, will be deformed downwardly. When the levers 87 and 88 are withdrawn, the discs 55 serve as compression spring biasing means for insuring downward movement of the shafts 27 and 28 and reconnection of the clutch elements 68 and 70.

It may thus be seen that regardless of position of the ball 15, the signal structures 30 may be returned to their zero or null positions merely by operation of the switch 17 and that the exposed portion of the ball 15 is thereby always available for movement in a manner to displace the tracking pip 14 from a central location on the face 12 of the cathode ray tube. Accordingly, there is no limit of movement of the ball 15, inasmuch as the zero or null position of the signal structures 30 may be reestablished at any time by operation of the switch 17.

Through use of the mechanism hereof, and particularly the control ball 15 and motion transmitting devices 31 and 32, smooth and substantially effortless tracking control is accomplished, there being no quadrant feel by the operator as has been otherwise experienced with prior devices intended for different purposes and employing such structures as lever and gimbal systems. Additionally, inasmuch as the structure hereof employs an all friction drive for the translation of motion, no backlash or dwell is inherent in this structure. Furthermore, inasmuch as the exposed portion of the ball 15 need only be engaged by the finger tips of the operator in order to effect movement thereof, operator fatigue is held to a minimum and is substantially less than experienced when an operator must grasp a handle, wheel, crank or other similar mechanism.

While the control mechanism hereof has been described in connection with radar systems and devices and the positioning of an indication on the face of a cathode ray tube, it is to be understood that the present mechanism may be employed with other structures wherein integrated control is desired. This apparatus will then find utility in connection with many mechanisms and structures currently employing handles, wheels, universally mounted sticks or other similar structures.

Having thus described the invention and the present embodiment thereof, it is desired to emphasize the fact that many modifications may be resorted to in a manner limited only by a just interpretation of the following claims.

I claim:

1. In a control mechanism having an integrated input and a divided output: a supporting structure; a universally mounted control ball carried by said supporting structure; a pair of signal structures carried by said supporting structure; shaft means operatively associated with each of said signal structures; flexible disc means connected to ends of each of said shaft means remote from said signal structures; frictionally interconnected motion transmitting means disposed between said control ball and each of said flexible disc means, said motion transmitting means contacting said control ball on substantially normally disposed axes thereof; clutch means disposed intermediate said shaft means and said signal structure; and means for operating said clutch means.

2. A control mechanism having an integrated input and a divided output, comprising in combination: a supporting structure; a universally mounted control ball carried by said supporting structure; a pair of signal structures carried by said supporting structure; shaft means rotatably carried by said supporting structure and connected to and disposed from each of said signal structures; flexible discs connected to ends of said shaft means remote from each of said signal structures; frictionally interconnected motion transmitting means pivotally carried by said supporting structure and disposed between said control ball and each of said flexible discs, said motion transmitting means contacting said control ball on substantially normally disposed axes thereof; clutch means disposed intermediate said shaft means and said signal structure; and electrically operated means for operating said clutch means whereby to disengage said shaft means and said motion transmitting means from said signal structures.

3. A tracking control mechanism comprising, in combination: a base member; a control ball universally pivotally mounted on said base member; a pair of electrical signal structures mounted on said base member; plural operational shaft means pivotally carried by bracket means disposed from said base member; clutch means disposed in each of said shaft means, said cltuch means having clutch elements carried by opposing ends of portions of said shaft means, one of each of said shaft portions being connected with each of said signal structures; discs carried by other portions of each of said shaft means, said other portions of each of said shaft means each having an enlargement thereon; motion transmitting structures carried by said base member and disposed between said control ball and each of said discs, said motion transmitting structures having frictional engaging elements disposed in contact with said control ball and said discs, frictional engaging elements engaging said control ball being disposed on substantially normal axes of said control ball and rotatable about axes lying in a plane passing through an axis of said control ball; a rotary solenoid carried by said base member; a bifurcated arm disposed in association with each of said shaft means; and linkage means interconnecting said arms with said solenoid, said solenoid being adapted upon energization to move said arms into engagement with said enlargements whereby to separate elements of said clutch means.

4. A tracking control mechanism comprising, in combination: a base member; a control ball universally pivotally mounted on said base member; a pair of electrical signal structures mounted on said base member; plural operational shaft means pivotally carried by bracket means disposed from said base member; clutch means disposed in each of said shaft means, said clutch means having clutch elements carried by opposing ends of portions of said shaft means, one of each of said shaft portions being connected with each of said signal structures; flexible discs carried by other portions of each of said shaft means, said other portions of each of said shaft means each having a conically faced enlargement thereon; motion transmitting structures carried by said base member and disposed between said control ball and each of said flexible discs, said motion transmitting structures having frictional engaging elements disposed in contact with said control ball and said discs, frictional engaging elements engaging said control ball being disposed on substantially normal axes of said control ball and rotatable about axes lying in a plane passing through an axis of said control ball; a spring return biased rotary solenoid carried by said base member; a bifurcated arm disposed in association with said conically faced enlargements of each of said shaft means; and linkage means interconnecting said arms with said solenoid, said solenoid being adapted upon energization to move said arms into engagement with said enlargements whereby to separate elements of said clutch means.

5. A tracking control mechanism comprising, in combination: a base member; a control ball universally pivotally mounted on said base member; a pair of electrical signal structures mounted on said base member; plural operational shaft means pivotally carried by bracket means disposed from said base member; clutch means disposed in each of said shaft means, said clutch means having clutch elements carried by opposing ends of portions of said shaft means, one of each of said shaft portions being connected with each of said signal structures; discs carried by other portions of each of said shaft means, said other portions of each of said shaft means each having an enlargement thereon; motion transmitting structures carried by said base member and disposed between said control ball and each of said discs, said motion transmitting structures having frictional engaging elements disposed in contact with said control ball and said discs, frictional engaging elements engaging said control ball being disposed on substantially normal axes of said control ball and rotatable about axes lying in a plane passing through an axis of said control ball; a rotary solenoid carried by said base member; a bifurcated arm disposed in association with each of said shaft means; linkage means interconnecting said arms with said solenoid, said solenoid being adapted upon energization to move said arms into engagement with said enlargements whereby to separate elements of said clutch means; roller means carried by each of said arms; and a cam carried by said one of each of said shaft portions, said roller means being adapted for engagement with said cams upon said movement of said arms whereby to rotate said one of each of said shaft portions in a direction to return said signal structures to a zero position thereof.

6. A radar tracking control mechanism comprising, in combination: a base member; a control ball universally pivotally mounted on said base member; a pair of electrical signal structures mounted on said base member; plural operational shaft means pivotally carried by bracket means disposed from said base member; clutch means disposed in each of said shaft means, said clutch means having clutch elements carried by opposing ends of portions of said shaft means, one of each of said shaft portions being connected with each of said signal structures; flexible discs carried by other portions of each of said shaft means, said other portions of each of said shaft means each having a conically faced enlargement thereon; motion transmitting structures pivotally carried by said base member and disposed between said control ball and each of said flexible discs, said motion transmitting structures having frictional engaging elements disposed in contact with said control ball and said discs, frictional engaging elements engaging said control ball being disposed on substantially normal axes of said control ball and rotatable about axes lying in a plane passing through an axis of said control ball; a spring return biased rotary solenoid carried by said base member; a bifurcated arm disposed in association with said conically faced enlargements of each of said shaft means; linkage means interconnecting said arms with said solenoid, said solenoid being adapted upon energization to move said arms into engagement with said enlargements whereby to separate elements of said clutch means; a roller carried by each of said arms; and a cam carried by said one of each of said shaft portions, said rollers being adapted for engagement with said cams upon said movement of said arms whereby to rotate said one of each of said shaft portions in a direction to return said signal structures to a zero position thereof, de-energization of said solenoid serving to permit return of said arms and said one of said shaft means to their original positions.

7. A radar tracking control mechanism comprising, in combination: a base member; a control ball universally pivotally mounted on said base member; a pair of rotary operated electrical signal structures mounted on said base member; plural operational shaft means pivotally carried by bracket means disposed from said base member; clutch means disposed in each of said shaft means, said clutch means having clutch elements carried by opposing ends of portions of said shaft means, one of each of said shaft portions being connected with each of said signal structures; flexible discs carried by upper ends of other portions of each of said shaft means, said other portions of each of said shaft means each having a conically faced enlargement thereon; motion transmitting structures pivotally carried by said base member and disposed between said control ball and each of said flexible discs, said motion transmitting structures having frictional engaging elements disposed in contact with said control ball and said discs, frictional engaging elements engaging said control ball being disposed on substantially normal axes of said control ball and rotatable about axes lying in a plane passing through an axis of said control ball; spring means for biasing said frictional engaging elements into contact with said disc and said control ball; a spring return biased rotary electrical solenoid carried by said base member; means for energizing said solenoid; a bifurcated arm disposed in association with said conically faced enlargements of each of said shaft means, said arms having a beveled free end; linkage means interconnecting said arms with said solenoid, said solenoid being adapted upon energization longitudinally to move said arms into engagement with said enlargements whereby to separate elements of said clutch means; a roller carried by each of said arms; and a cam carried by said one of each of said shaft portions, said rollers being adapted for engagement with said cams upon said movement of said arms whereby to rotate said one of each of said shaft portions in a direction to return said signal structures to a zero position thereof, de-energization of said solenoid serving to permit said spring biased return of said arms and said shaft portions to their original positions; and means for insuring rotation of said cams in said direction.

References Cited in the file of this patent

UNITED STATES PATENTS

| | | |
|---|---|---|
| 2,034,825 | Newell | Mar. 24, 1936 |
| 2,219,636 | Schwartz | Oct. 29, 1940 |
| 2,585,120 | Harrington | Feb. 12, 1952 |
| 2,586,421 | Evers | Feb. 19, 1952 |
| 2,693,709 | Newell | Nov. 9, 1954 |
| 2,769,596 | Loosli | Nov. 6, 1956 |